Oct. 11, 1932.  F. H. BANBURY  1,881,994
RUBBER WORKING MACHINE
Filed Nov. 28, 1927
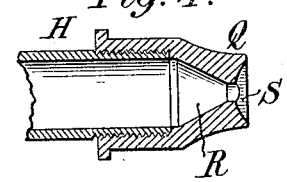
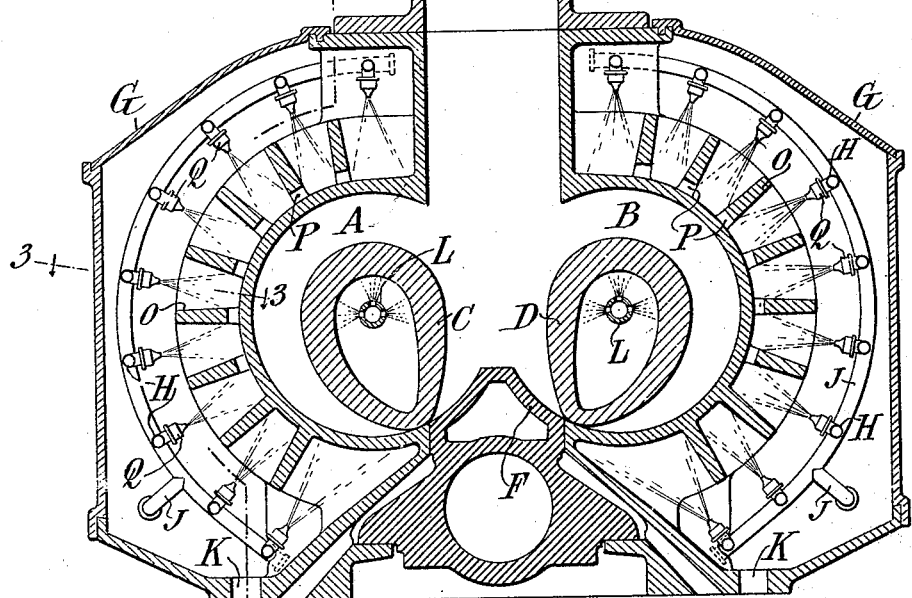
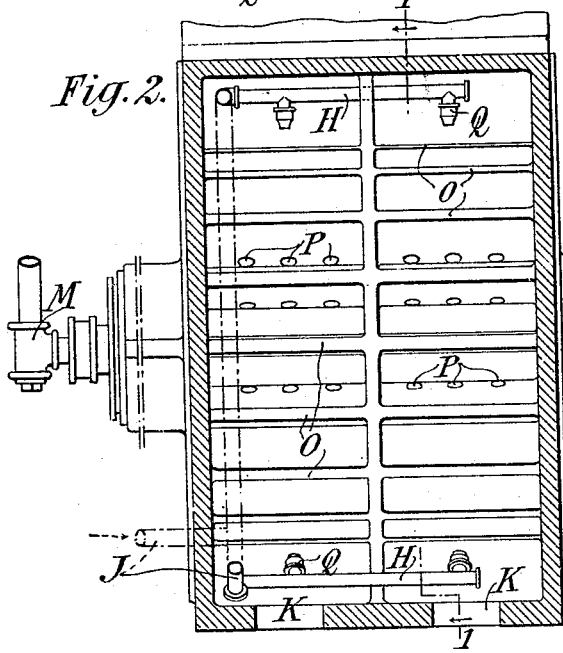
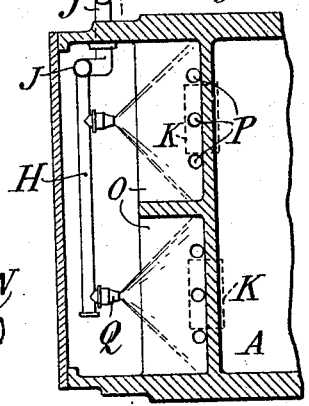
INVENTOR:
Fernley H. Banbury,
By Attorneys, Patented Oct. 11, 1932

1,881,994

UNITED STATES PATENT OFFICE

FERNLEY H. BANBURY, OF ANSONIA, CONNECTICUT, ASSIGNOR TO FARREL-BIRMINGHAM COMPANY, INCORPORATED, OF ANSONIA, CONNECTICUT, A CORPORATION OF CONNECTICUT

RUBBER WORKING MACHINE

Application filed November 28, 1927. Serial No. 236,137.

This invention relates to rubber machinery or the like, and aims to provide certain improvements therein.

The invention is particularly directed to machines for working rubber or rubber compositions, such as mixers, tubing or extruding machines or the like. In most cases where a somewhat plastic rubber composition is worked heat is rapidly generated, and this is particularly true in rubber mixers of various types, the function of which is to thoroughly mix the rubber and other ingredients to form rubber compositions suitable for tires, mechanical rubber goods, etc. The same heat conditions prevail in tubing machines and the like.

In the well-known Banbury mixers which have become standard in the art, the composition is mixed by a smearing or kneading action due to the rotation of a blade or blades around the interior wall of a cylinder or cylinders. This method of mixing which has to a considerable extent superseded other methods, is also subject to the rapid development of heat in the batch being mixed and in the walls of the mixer itself. It has heretofore been assumed in the art that the most effective method of cooling the machines and the batches contained therein was to water jacket the cylinders and to pass a stream of cooling water continuously through the jacket and in most cases through the interior of the rotors themselves.

In former years where sulphur was largely relied upon as the vulcanizing agent a sufficiently low temperature has been maintained by such methods of water cooling, since with such compositions there is no important tendency to vulcanize in the machines under 230° F. In recent years, however, the use of accelerators in the rubber composition has become practically universal, and such compositions almost invariably vulcanize at a lower temperature, it being often dangerous to the batch to permit its temperature to rise above 200°. Rubber compositions with such accelerators have proven so valuable in the rubber trade that their advantages have largely outweighed the increased difficulties of mixing without partial vulcanization, but as the critical temperature of the batch has been reduced, more and more difficulty has been occasioned in maintaining the relatively low temperatures required. No other cooling means has heretofore been discovered which has been more efficient than water-jacketing, and vigorous efforts have been made to bring such water-jacket systems up to the cooling requirements of the newer compositions. Numbers of rubber concerns have gone so far as to install refrigerating plants wherein the cooling water has been largely reduced in temperature, but such refrigerating plants have been very costly to erect and maintain, and their action is not always efficient and reliable. The problem of producing an inexpensive and effective cooling system applicable to existing conditions in various parts of the country has been so far as I am aware an unsolved one up to the present invention. Large quantities of cooling water are necessarily used in the production of rubber goods and the source from which said water has been obtainable range from deep wells to shallow lakes with a wide spread in temperature between them.

In my investigations of the problem I have found that in all water-jacketing systems only a very small percentage of the water actually comes in contact with the surfaces to be cooled, and that this contact is most inefficient in producing the necessary heat interchange between the surfaces to be cooled and the cooling water. It is my belief that a large percentage of the water flows idly through the center or middle parts of the passages while a smaller percentage actually sweeps past the surfaces and probably proceeds at a lower rate of speed, sluggishly moving toward the outlet. I also believe that there is in the use of water-jackets a thin film of water which might be said to adhere to the surfaces with the effect that the conduction of heat to the main body is slow and ineffective.

These conditions do not greatly improve even when inordinate quantities of water are used, and while refrigeration of the water is helpful, it does not solve the problem because of its ineffective application to the surface to be cooled.

After considerable experiment I have found that these various disadvantages can be practically completely avoided; that refrigeration can be done away with; and that cooling waters of a wide range of temperature can be used while still maintaining the necessary low degree of temperature in the mixers. This I accomplish by the simple expedient of causing the cooling water to impinge against the surfaces to be cooled at a substantial angle to such surface, and this is particularly true if the water be caused to impinge in the form of spray or fine jets. The angle at which the impingement takes place may be a right angle or less than a right angle, the latter perhaps being somewhat preferable as the spray water after impingement may then rebound from or otherwise leave the cooling surface in such a way as not to interfere with the oncoming spray. By the method of direct impingement, apparently the interchange of heat between the surface to be cooled and the water is greatly increased, so that per second of time with a given area of cooling surface I am enabled to abstract from the latter a considerably greater number of heat units than I believe to be possible with the water-jacket system under analogous conditions.

Where the use of water on the outside of the cooling surface is not disadvantageous, the spraying pipes may be arranged on the exterior of the machine, but customarily I place these pipes within a water-jacket surrounding the surfaces to be cooled, so that spattering of water around the machines is avoided, the water being let off by the ordinary exit pipe. It is much preferable, of course, to proportion the passages and pipe so that drainage will be rapid and the passages will never become filled or clogged with water.

By the system provided by the present invention the water may be reused for a considerable length of time, it being preferable, of course, that its temperature be not permitted to rise too greatly, since, of course, in any system the interchange of heat is more rapid in proportion to the temperature differential between the surface to be cooled and that of the water.

In the drawing wherein I have illustrated the invention as applied to the well-known Banbury mixer,—

Figure 1 is a vertical cross section of one type of mixer taken approximately on the line 1—1 in Fig. 2.

Fig. 2 is a section taken on the line 2—2 in Fig. 1.

Fig. 3 is a section through one side of the device taken on the line 3—3 in Fig. 1.

Fig. 4 is a sectional view of a form of nozzle which may be used.

In the type of machine which I have chosen to illustrate my invention, namely, the standard Banbury mixer, A and B are two cylindrical members within which rotate the rotors C and D respectively. These rotors rotate in opposite directions and have advancing surfaces in the form of blades which form an acute angle with the cylinder walls in the direction of rotation, and thereby smear the rubber mixture against the cylinder walls, picking it up and kneading it and feeding it toward the longitudinal center of the mixer, the batch being forced from one cylinder to the other in its travel, and finally being taken from the machine to a center door or gate, such as F, arranged in the lower part of the section between the two cylinders, which door is shown as constructed to open by sliding. The rotors C and D are preferably hollow, as shown.

It will be seen from the cross-section of Fig. 1 that I provide an exterior waterjacket G for the cylinders, and within this water-jacket I locate a plurality of spray pipes H whose nozzles are directed toward the surfaces to be cooled. The jets issuing from the nozzles spread somewhat before reaching such surfaces, but in any event the great bulk of the water forming the jets impinge against the surfaces to be cooled at a substantial angle, as distinguished from flowing along the surfaces in a parallel direction. Water may be introduced into the spray pipes in any suitable way as through the supply pipes J leading to a reservoir which is not shown in the drawing. The water discharged from the lower part of the machine through passages K K may flow back into the reservoir through a suitable pump, if reservoir pressure is relied upon initially to cause the flow. A liberal quantity of water should be used but this may be repeatedly reused. The conditions of water supply and cost vary so widely that no specific directions can be given, but generally speaking, with an adequate supply at a temperature of water at 55° to 65°, the latter may be reused a considerable number of times, each passage through the machine perhaps raising its temperature from 1° to 2°. Where water is obtained practically without cost, reusing is, of course, not necessary or desirable.

In the construction shown, similar spray pipes L may be used to cool the rotors C and D, such pipes being led in and discharged through the ends of the rotor, as shown at M and N respectively.

It will also be noted that the walls of the cylinder may be strengthened by fins O O which to some extent also aid in the cooling, these fins being more or less bathed with spray water. Perforations P permit escape of the water.

I may use as a spraying system a mere pipe provided with holes, but better results and less liability of clogging are obtained by the employment of spray-nozzles of some one of the approved commercial types, such for instance as that shown in Fig. 4, wherein the nozzle Q is formed with a dome or cone shaped interior R which is connected to an exterior slot S. This and other nozzles deliver a spray which is somewhat coarser than a mist, but which is nevertheless in the form of fine drops. These should reach the surface to be cooled with some slight force, or at least the pressure behind the spray should be adequate to compel the drops to make contact with the surface to be cooled. I have found a pressure of ten pounds on the water is ample, although lower pressures may be used, and higher pressures also. The usual pressures now commonly employed for water circulation in jackets can hence ordinarily be availed of without change.

It is best that each particle of water used should impinge against a part of the surface to be cooled at an angle which is sufficient to cause a direct impact against the surface, so that each particle of water is brought into intimate contact with the surface. I have found in practice that the water may be projected against the surfaces by air pressure, such as by the well-known atomizing mechanisms, if this be desired.

While I have shown and described one form of the invention, it will be understood that I do not wish to be limited thereto, as various changes may be made therein without departing from the spirit of the invention.

What I claim is:

1. In a rubber working machine, the method of cooling the working surfaces of the mixing chamber, which comprises spraying the cooling medium directly against the rear of said surfaces and withdrawing the sprayed medium so as to avoid an accumulation of such medium which would interfere with the continued spraying action.

2. In a rubber working machine, the method of cooling the working surfaces of the mixing chamber, which comprises spraying the cooling water directly against the rear of said surfaces, and rapidly draining off the sprayed water, so that the spraying action is not interfered with by water accumulation.

3. A rubber mixer having a cylinder and a rotor adapted to knead or smear the composition between them and the cylinder having spraying means located around it, with means for supplying a cooling fluid to said spraying means, the parts being constructed to permit the free escape of the cooling fluid so that continuous spraying without interference of an accumulated body of cooling fluid is secured.

4. A rubber mixer having a cylinder and a rotor adapted to knead or smear the rubber composition between them, a closure for said cylinder forming a cooling chamber with means for supplying a cooling fluid in the form of spray directly to the exterior of said cylinder, and means for permitting the free escape of said cooling fluid from said casing whereby to avoid substantial accumulation of the cooling fluid in said casing.

5. A rubber mixer having a cylinder and rotor adapted to knead or smear the composition between them and the cylinder having spraying means located around it, with means for supplying a cooling fluid to said spraying means, the parts being constructed to permit the free escape of the cooling fluid so that continuous spraying without interference of an accumulated body of cooling fluid is secured, and said spraying means acting to deliver the spray against the surface to be cooled at substantially a right angle to the latter.

6. A rubber machine having a rotor having a hollow interior, means for spraying a cooling fluid against the upper side of the interior wall of said rotor, and means for draining the fluid from said rotor so as to leave said upper side free from accumulated fluid.

7. A rubber mixer having a pair of cylinders and a pair of rotors formed to smear the rubber composition against the interior walls of said cylinders, means for spraying the exterior of said cylinders with a cooling fluid, a jacket for enclosing said means, means for spraying the upper side of the interior walls of said rotors with a cooling fluid, and means for draining the cooling fluid after being so sprayed with sufficient rapidity to prevent accumulated fluid in the path of the spray.

In witness whereof, I have hereunto signed my name.

FERNLEY H. BANBURY.